*L. Griswold,*
*Milling Tool.*
No. 111,927. Patented Feb. 21, 1871.
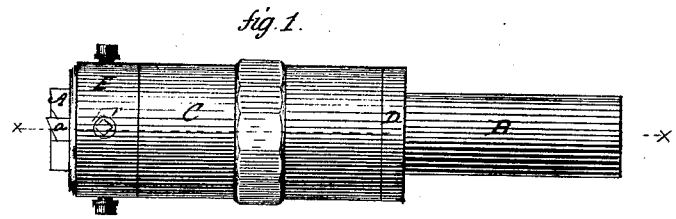
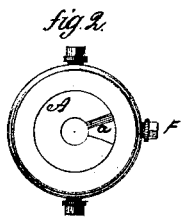
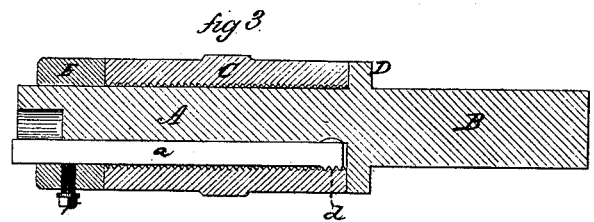
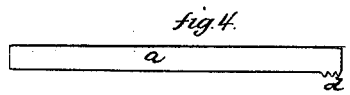
Witnesses
J. H. Shumway
A. J. Tibbits
Levi Griswold
Inventor
By his Attorney
John E. Earle

United States Patent Office.

LEVI GRISWOLD, OF BRANFORD, CONNECTICUT.

Letters Patent No. 111,927, dated February 21, 1871.

IMPROVEMENT IN MILLING-TOOLS.

The Schedule referred to in these Letters Patent and making part of the same.

*To all whom it may concern:*

Be it known that I, LEVI GRISWOLD, of Branford, in the county of New Haven and State of Connecticut, have invented a new Improvement in Milling-Tool; and I do hereby declare the following, when taken in connection with the accompanying drawing and the letters of reference marked thereon, to be a full, clear, and exact description of the same, and which said drawing constitutes part of this specification, and represents in—

Figure 1 a side view;
Figure 2, an end view;
Figure 3, a longitudinal section; and in
Figure 4, the cutter detached.

This invention relates to an improvement in milling-tools especially designed for milling-followers in locks, but applicable for other purposes, the object being the construction of a longitudinal cutter, easily adjustable to be ground or sharpened without removing from the holder; and It consists in the arrangement of a cutter in a longitudinal groove formed in a spindle, and around the said spindle an internally-threaded sleeve, with corresponding threads in the cutter, so that by turning the sleeve the cutter may be thrown out or drawn in, as the case may be.

A is the spindle, formed upon a shank, B, by which the spindle is attached to a mandrel, or otherwise, to give to the spindle a revolving motion.

Upon one side of the spindle a longitudinal groove is formed, in which a cutter, $a$, is arranged, fitting so as to slide freely longitudinally in the said groove.

Over the spindle a sleeve, C, is arranged, threaded upon its inside, as seen in fig. 3, yet so as to be turned freely around the spindle.

The sleeve sits against a collar, D, and at the other end of the sleeve a movable collar, E, is set onto the spindle to prevent any longitudinal movement of the sleeve.

The inner end of the cutter is constructed with three or four threads corresponding, and so as to fit the threads of the sleeve; therefore, by turning the sleeve in one direction the cutter will be thrown out, and a reverse movement will draw the cutter in, by which operation the projection of the cutter may be easily adjusted, and when the cutter is properly adjusted a set-screw, F, through the collar E, is turned down onto and so as to fix the cutter firmly.

When it is desired to sharpen the cutter, run it out a short distance by turning the sleeve C, grind or otherwise sharpen the cutting edge, then draw in the cutter, and set it, as before.

The cutter is so long that it may be used for a great length of time, and does not require to be removed for sharpening, hence a great deal of time in the use of the tool is saved.

I claim as my invention—

The cutter $a$, arranged longitudinally in the spindle A, constructed with the shank B, collars D E, the said cutter threaded and combined with the sleeve C, around the said spindle, between the said two collars, for the adjustment of the cutter, substantially as described.

LEVI GRISWOLD.

Witnesses:
J. H. SHUMWAY,
A. J. TIBBITS.